United States Patent
Kwon et al.

(10) Patent No.: US 9,477,736 B2
(45) Date of Patent: Oct. 25, 2016

(54) APPARATUS AND METHOD FOR ACTIVE AND PASSIVE DATA GATHERING USING STOCHASTIC MODEL IN CONTROL NETWORK

(71) Applicant: SAMSUNG SDS CO., LTD., Seoul (KR)

(72) Inventors: Soonmok Kwon, Seoul (KR); Yongkeun Yun, Seoul (KR); Dongho Yoo, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 391 days.

(21) Appl. No.: 14/245,612

(22) Filed: Apr. 4, 2014

(65) Prior Publication Data

US 2015/0120657 A1 Apr. 30, 2015

(30) Foreign Application Priority Data

Oct. 31, 2013 (KR) .................. 10-2013-0130827

(51) Int. Cl.
*G06F 17/30* (2006.01)

(52) U.S. Cl.
CPC .............. *G06F 17/30575* (2013.01)

(58) Field of Classification Search
None
See application file for complete search history.

(56) References Cited

U.S. PATENT DOCUMENTS

| 7,912,950 | B1 | 3/2011 | Saparoff |
| 2004/0184431 | A1 | 9/2004 | Park |
| 2005/0005010 | A1 | 1/2005 | DeLuca et al. |
| 2006/0045020 | A1* | 3/2006 | Picco .............. H04J 3/0682 370/249 |
| 2011/0264967 | A1 | 10/2011 | Lovy et al. |
| 2012/0016820 | A1* | 1/2012 | Walker .............. G06F 17/3002 706/12 |
| 2012/0320902 | A1* | 12/2012 | Na ................ G06F 1/14 370/350 |
| 2013/0073586 | A1* | 3/2013 | Aubry .............. G06F 17/30477 707/769 |
| 2014/0079297 | A1* | 3/2014 | Tadayon .............. G06K 9/00 382/118 |

FOREIGN PATENT DOCUMENTS

| JP | 05-191472 A | 7/1993 |
| JP | 06-111030 A | 4/1994 |
| JP | 11-015714 A | 1/1999 |
| JP | 2002-099327 A | 4/2002 |
| JP | 2009-070017 A | 4/2009 |
| KR | 10-2005-0000879 A | 1/2005 |
| KR | 10-2006-0076181 A | 7/2006 |
| KR | 10-2007-0105488 A | 10/2007 |
| KR | 10-2010-0069397 A | 6/2010 |
| KR | 10-2011-0125045 A | 11/2011 |
| KR | 10-1081486 B1 | 11/2011 |
| KR | 10-2012-0087263 A | 8/2012 |
| KR | 10-2013-0082630 A | 7/2013 |
| KR | 10-2013-0117188 A | 10/2013 |

* cited by examiner

*Primary Examiner* — Wilson Lee
(74) *Attorney, Agent, or Firm* — Sughrue Mion, PLLC

(57) ABSTRACT

There is provided an apparatus and method for active and passive data gathering using a stochastic model in a control network. An active and passive synchronizer performs a first gathering operation in which a data request frame is transmitted via the control network and data on the local devices is gathered and a second gathering operation in which data on the local devices is gathered by reading a communication frame among the local devices, and determines a first gathering operation schedule for each data stored in a cache unit based on an expected delay time estimated using a stochastic model for the second gathering operation process when the first gathering operation is not performed on each data that is gathered through the first gathering operation and the second gathering operation and is stored in the cache unit and waiting is performed until the data is updated through the second gathering operation.

19 Claims, 7 Drawing Sheets

APPARATUS AND METHOD FOR ACTIVE AND PASSIVE DATA GATHERING USING STOCHASTIC MODEL IN CONTROL NETWORK

CROSS-REFERENCE TO RELATED APPLICATION

This application claims priority to and the benefit of Korean Patent Application No. 2013-0130827, filed on Oct. 31, 2013, the disclosure of which is incorporated herein by reference in its entirety.

BACKGROUND

1. Field of the Invention

Exemplary embodiment relate to an apparatus and method for active and passive data gathering using a stochastic model in a control network, and more specifically, to a data gathering apparatus capable of synchronizing data of other apparatuses and its own buffer at a high speed and a method thereof.

2. Discussion of Related Art

A control network is a local network that is used to transmit and receive measurement and control data in order for devices such as air conditioners, sensors, production equipment, a programmable logic controller (PLC), and supervisory control and data acquisition (SCADA) to operate in accordance with the purpose in a specific space such as a building and a plant. Various communication media and communication protocols may be used in the control network. For example, a twisted pair (TP), wireless, Ethernet, and the like may be used as the communication media. For example, BACnet, KNX, Modbus, and OPC may be used as the communication protocol.

Up to now, in general, control networks are internally used to operate a building or a plant having a network installed therein. However, recently, as applications such as big data analysis or machine to machine (M2M) emerge, cases in which measurement and control data of devices is gathered using the control network and the data is provided to systems outside the building or the plant are increasing. Examples of such systems include a building energy management system (BEMS) and a building group management system.

In order to gather measurement and control data of the control network and provide the data to an external system, a data gathering apparatus that gathers data in other devices inside the control network, stores the data in its own buffer, and transmits the data to an external service is usually utilized. Such a device is also called a data gatherer. The data gatherer utilizes control network communication media and communication protocols in order to obtain measurement and control data from internal devices of the control network, and utilizes communication networks such as the Internet in order to communicate with an external system.

The data gatherer has a significant influence on entire system performance between an external system (a system outside a site operated based on measurement and control data gathered by a data gatherer) and an internal system (a system for operating its own site process) of a site (site: such as a building and a plant). However, when there is a large amount of data to be gathered, an existing data gatherer causes a high load in the internal system which resulted in a communication failure, and increases a data gathering delay time in the external system which resulted in a quality degradation of a system service.

Up to now, in order to address performance problems related to the data gathering, the control network is expanded or the data gatherer is additionally input in general, which resulted in an increase of equipment costs. In order to address such a problem, before the network is expanded, performance improvement of data gatherer itself needs to be studied in consideration of internal and external system characteristics. However, up to now, there is no such a solution.

Meanwhile, among previously disclosed Patent Documents, when Patent Documents related to devices for gathering data from a plurality of devices without being limited to the control network are reviewed, these are mainly focused on only utilizing various external variables related to active synchronization, but there is no patent considering optimization of passive synchronization. For example, Korean Patent Application No. 2005-0000879 discloses only a device information gathering system that can perform adaptive polling in network management according to a device state and a method thereof, and US Patent Application No. 2011-0264967 discloses only a method of utilizing a virtual state machine when data is gathered from a plurality of devices.

PATENT DOCUMENTS

Korean Patent Application No. 2005-0000879 (Publication date: Jan. 6, 2005, Title of invention: Device information collecting system in network management and method thereof)

US Patent Application No. 2011-0264967 (Publication date: Oct. 27, 2011, Title of invention: Method and apparatus for maintaining status of objects in computer networks using virtual state machines)

U.S. Pat. No. 7,912,950 (Publication date: Mar. 22, 2011, Title of invention: Adaptive polling facility for network monitoring system)

US Patent Application No. 2005-0005010 (Publication date: Jan. 6, 2005, Title of invention: System and method for implementing polling agent in client management tool)

US Patent Application No. 2004-0184431 (Publication date: Sep. 23, 2004, Title of invention: Apparatus and method for managing device information through networks)

SUMMARY OF THE INVENTION

One or more exemplary embodiments provide an apparatus and method for active and passive data gathering using a stochastic model in a control network that can improve data gathering performance from the control network with low hardware specifications by efficiently synchronizing data in other devices and its own buffer.

One or more exemplary embodiments also provide a computer readable recording medium recording a program that causes a computer to execute an active and passive data gathering method using a stochastic model in a control network that can improve data gathering performance from the control network with low hardware specifications by efficiently synchronizing data in other devices and its own buffer.

According to an aspect of an exemplary embodiment, there is provided a data gathering apparatus. The apparatus includes a cache unit configured to store data, gathered from local devices connected via a control network, and constituting cached data items; an active and passive synchronizer configured: to perform a first gathering operation in which: a data request frame is transmitted via the control network, and data on the local devices is gathered and stored as cached data items; to perform a second gathering operation in which data on the local devices is gathered and stored as cached data items by reading a communication frame communicated over the control network; and to determine a first gathering operation schedule for each of the cached data items based on an expected delay time, estimated using a stochastic model for the second gathering operation process, in case that waiting is performed until the each of the cached data items is updated through the second gathering operation without performing the first gathering operation; and an active and passive medium access unit having a receiver and a transmitter, configured to deliver data obtained from a frame received via the control network to the active and passive synchronizer and to transmit a frame for gathering data on the local devices of the control network in response to a request of the active and passive synchronizer.

According to an aspect of another exemplary embodiment, there is provided a data gathering method including: (a) performing a first gathering operation including: transmitting a data request frame, from a transmitter, via the control network, gathering first data about the local devices, and storing data items, corresponding to the first gathered data, in a cache memory; (b) performing a second gathering operation including: gathering second data about the local devices by reading a communication frame communicated among the local devices, and storing data items, corresponding to the second gathered data, in the cache memory; and (c) determining a first gathering operation schedule for each of the cached data items, based on an expected delay time, estimated using a stochastic model for the second gathering operation process, in case that waiting is performed until the each of the cached data items is updated through the second gathering operation without performing the first gathering operation.

BRIEF DESCRIPTION OF THE DRAWINGS

The above and other objects, features, and advantages of the inventive concept will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of a data gathering apparatus and a method thereof according to the inventive concept will be described in detail with reference to the accompanying drawings.

Technical features of the exemplary embodiments are that both an active synchronization method and a passive synchronization method are considered when data is gathered. In the exemplary embodiments, the active synchronization method refers to reading data by transmitting a data request frame via a control network. This active synchronization operation is also called polling. Also, in the exemplary embodiments, the passive synchronization method refers to reading necessary data by reading a communication frame between other devices. In the passive synchronization method, reading of the communication frame may be performed when a recipient set in the frame is a data gatherer and also is not the data gatherer (that is, when the data gatherer eavesdrops communication between third parties). The reason for considering the passive synchronization is that an internal system itself in a local area of the control network generally transmits and receives many frames and such frames are likely to include measurement data and control data to be gathered by the data gathering apparatus.

Figure 1:
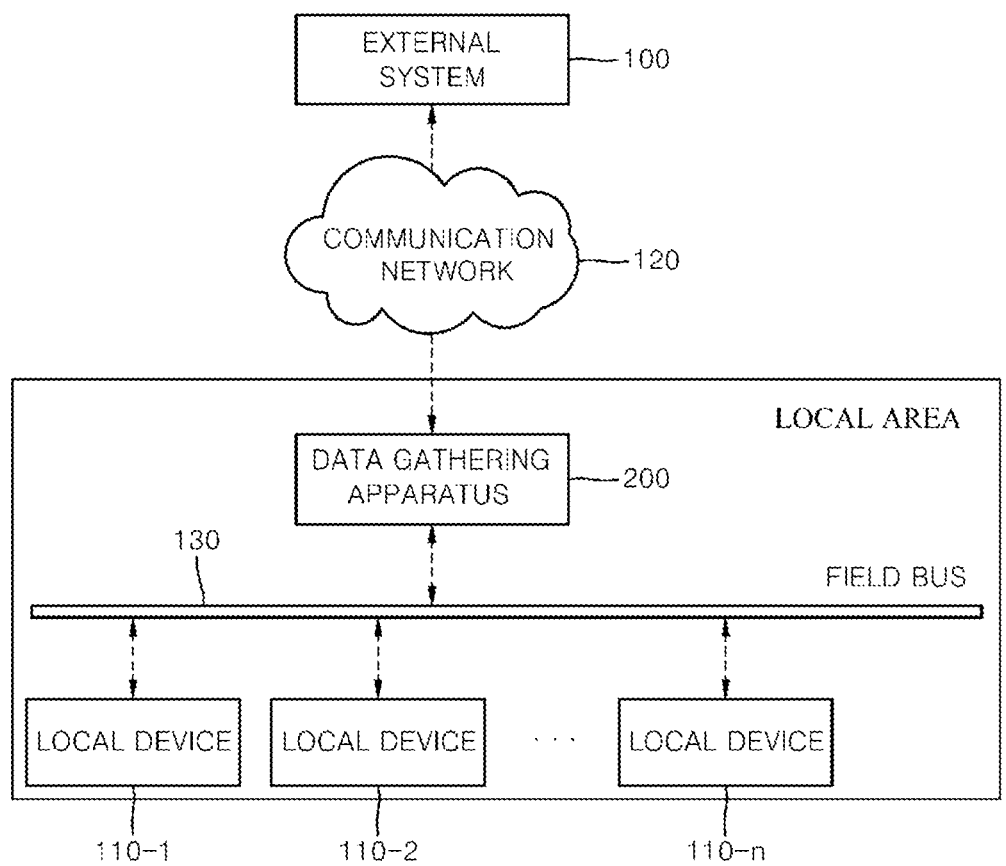
FIG. 1 is a diagram illustrating a network configuration to which a data gathering apparatus proposed in an exemplary embodiment is applied.

FIG. 1 is a diagram illustrating a network configuration to which a data gathering apparatus proposed in an exemplary embodiment is applied.

As illustrated in FIG. 1, an entire network includes an external system 100, a data gathering apparatus 200, and local devices 110-1 to 110-n. The external system 100 and the data gathering apparatus 200 are connected via a wired and/or wireless communication network 120 such as the Internet. Also, the data gathering apparatus 200 and the local devices 110-1 to 110-n are connected via a control network 130 such as a field bus. In this case, the external system refers to a system outside a site that is operated based on data gathered by a data gatherer, and the local devices 110-1 to 110-n refer to an operating apparatus connected to the control network 130 such as a building and a plant. In addition, the data gathering apparatus 200 and the local devices 110-1 to 110-n configure a local area.

Figure 2:
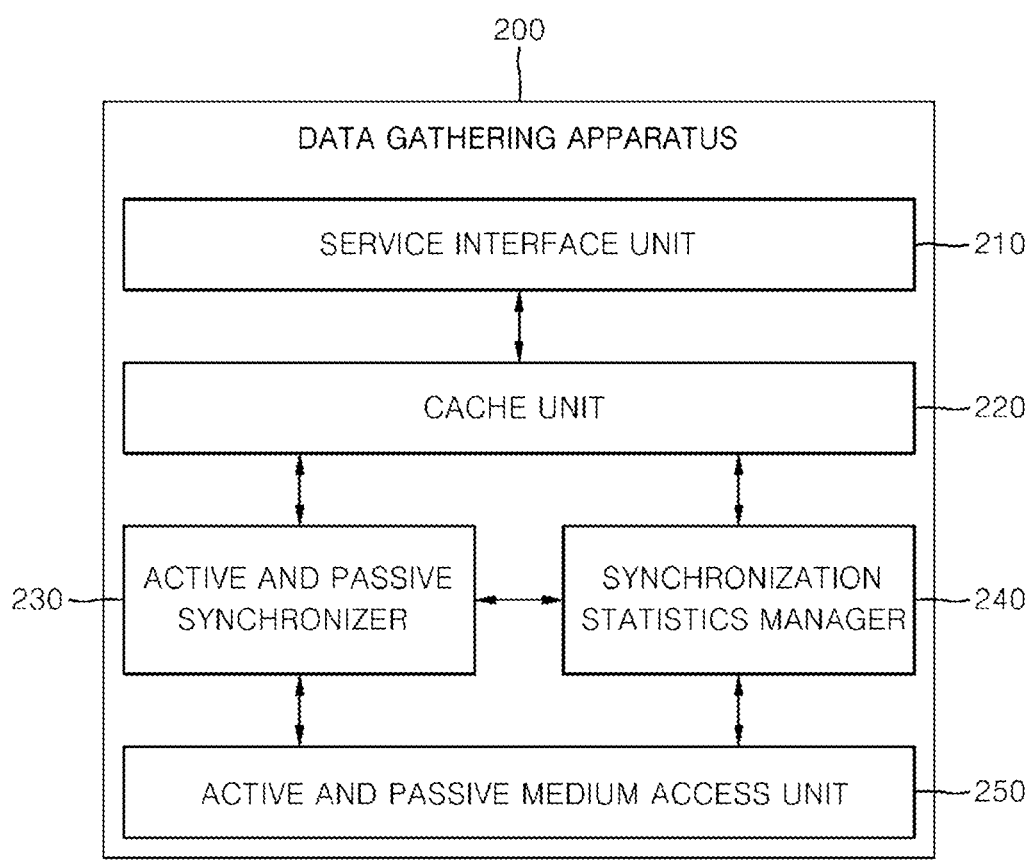
FIG. 2 is a block diagram illustrating a configuration of the data gathering apparatus according to the exemplary embodiment.

FIG. 2 is a block diagram illustrating a configuration of the data gathering apparatus according to the exemplary embodiment.

As illustrated in FIG. 2, the exemplary embodiment 200 of the data gathering apparatus includes a service interface unit 210, a cache unit 220, an active and passive synchronizer 230, a synchronization statistics manager 240, and an active and passive medium access unit 250.

The service interface unit 210 is a unit that receives data from the external system 100 or transmits data to the external system 100. For example, when the external system 100 puts a data identifier list in a request message and transmits the message to the data gathering apparatus 200, the service interface unit 210 may put data identifiers and content of measurement data and control data corresponding thereto in a response message and transmit the message to the external system 100 in response to the received request message. The service interface unit 210 includes a communication module configured to communicate with the external system 100 via the communication network.

The cache unit 220 stores data gathered from the local devices 110-1 to 110-n in the local area. The cache unit 220 may be implemented in the form of a memory buffer. The cache unit 220 stores measurement data and control data gathered from a plurality of the local devices 110-1 to 110-n. In the exemplary embodiment, each data item is defined as a single item. In this regard, an object and a data point correspond to the item in a BACnet standard and a KNX standard, respectively. Each item is made of a pair of a data identifier and data content. Therefore, the cache unit 220 may be a memory or a storage area in which sets of items are stored. In order to find values corresponding to the data identifiers, the service interface unit 210 queries the cache unit 220. Each data item stored in the cache unit 220 is updated with the latest value gathered from the local devices 110-1 to 110-n by the active and passive synchronizer 230. In addition, the cache unit 220 determines which data is stored in a cache among data gathered from the local devices in the control network. In order to determine the data to be stored, various methods may be used. All data may be stored without conditions, only data corresponding to an item set defined by a user may be stored, and determination on which item is stored may be dynamically changed.

The active and passive synchronizer 230 transmits a data request frame corresponding to items stored in the cache unit 220 to the control network 130, gathers data by receiving a response frame from the local devices 110-1 to 110-n (first gathering operation-active synchronization), or gathers data corresponding to items stored in the cache unit 220 by reading a communication frame among the local devices 110-1 to 110-n (second gathering operation-passive synchronization), and thereby updates data stored in the cache unit 220. The active and passive synchronizer 230 is a key component for improving performance of the data gathering apparatus 200.

The active and passive synchronizer 230 utilizes a stochastic model for a data update time interval and optimally schedules an active synchronization part. In this method, the data gathering apparatus 200 according to the exemplary embodiment may provide a minimum delay time for the external system 100 without increasing a load on the internal system. The active and passive synchronizer 230 may include a first embodiment for high-performance hardware (such as a memory and a processor) and a second embodiment for achieving almost optimal scheduling even when hardware performance is low. The second embodiment of the active and passive synchronizer 230 is called 'low-cost active and passive synchronization' and may include optimization algorithms that feed back a performance measurement result to an algorithm factor. The first embodiment and the second embodiment of the active and passive synchronizer 230 will be described below.

The synchronization statistics manager 240 creates and manages statistics related to the active and passive synchronization such as a data update cycle. The synchronization statistics manager 240 measures the following items for each item stored in the cache unit 220.

First, a statistical moment of a time interval in which an item is updated by the passive synchronization is measured. According to hardware specifications of the data gathering apparatus 200, it is determined up to which order a moment is measured. For example, when it is measured up to a second moment, a first moment (sample average) and a second moment (sample variance) are measured. Statistical moment calculation may be performed immediately after a message is read and an item is updated, and may be batch processed in an independent process or thread at predetermined time intervals after a simple record is performed when a message is received. Next, a time at which an item is updated last is measured by the active and passive synchronization methods.

In order to measure the statistical moment and update time described above, the synchronization statistics manager 240 may access the active and passive medium access unit 250 and retrieve data.

The active and passive medium access unit 250 serves as an interface which allows the active and passive synchronizer 230 to access a medium (that is, each of the local devices 110-1 to 110-n) of the control network 130. Before functions of the active and passive medium access unit 250 are described, concepts of a 'time slot' and an 'active synchronization quota' will be described as follows.

Figure 3:
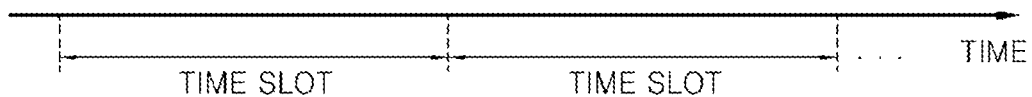
FIG. 3 is a diagram illustrating a time slot of an active and passive medium access unit included in the data gathering apparatus according to the exemplary embodiment.

FIG. 3 is a diagram illustrating a time slot of the active and passive medium access unit 250.

As illustrated in FIG. 3, the time slot is a constant unit into which a time is divided. Therefore, a medium access time is divided into time slots and is managed. It is preferable that a size of the time slot be set to have a value smaller than an average update time interval of cache items in a corresponding site. For example, the time slot may be set to one to two seconds in a system in which an average update interval of an item is 30 seconds to 1 minute.

The active synchronization quota is defined as a maximum number of times frame transmission can be performed in a single time slot by the active and passive medium access unit 250 for active synchronization. Instead of the number of times, various types of indicators that have the same meaning but are differently represented such as a maximum frame transmission frequency and a minimum frame transmission cycle may be used. This active synchronization quota sets a limit of the number of frames that can be transmitted from the data gathering apparatus 200 to the control network 130. That is, the active synchronization quota serves as a criterion of a communication load applied on the internal system by the data gathering apparatus 200. Allowable communication load is determined depending on environments, policies, and times of each site. In the exemplary embodiment, for the convenience of description, it is assumed that the active synchronization quota is predetermined and is not changed while the data gatherer operates. The active synchronization quota may be experimentally determined and the active synchronization quota may be dynamically changed depending on time elapse, and environments, policies, and times of each site.

Based on the concepts of the time slot and the active synchronization quota described above, the active and passive medium access unit 250 performs the following at least two functions.

First, all frames detected from the medium (that is, each of the local devices 110-1 to 110-n) are delivered to the active and passive synchronizer 230. In this case, even when a recipient displayed in the frame is not the data gathering apparatus 200, the active and passive medium access unit 250 delivers the frame to the active and passive synchronizer 230. Next, when frame transmission is requested from the active and passive synchronizer 230, if the active synchronization quota is not violated in a time slot of a corresponding time point, the frame is immediately transmitted or is stored in a transmission buffer, and the active and passive synchronizer 230 is notified that transmission is successful. On the other hand, when frame transmission is requested from the active and passive synchronizer 230, if the active synchronization quota is violated in a time slot of a corresponding time point when the frame is transmitted, no frame is transmitted and the active and passive synchronizer 230 is notified that transmission is failed.

Detailed schedules for transmitting, by the active and passive medium access unit 250, the frame may be implemented by various methods. Also, when frame transmission is requested from the active and passive synchronizer 230, if the active and passive medium access unit 250 confirms that the active synchronization quota is not violated in a time slot of a corresponding time point, the frame may be immediately transmitted, or may also be transmitted according to a transmission schedule after the frame is stored in a buffer provided in the active and passive medium access unit 250.

Figure 4:
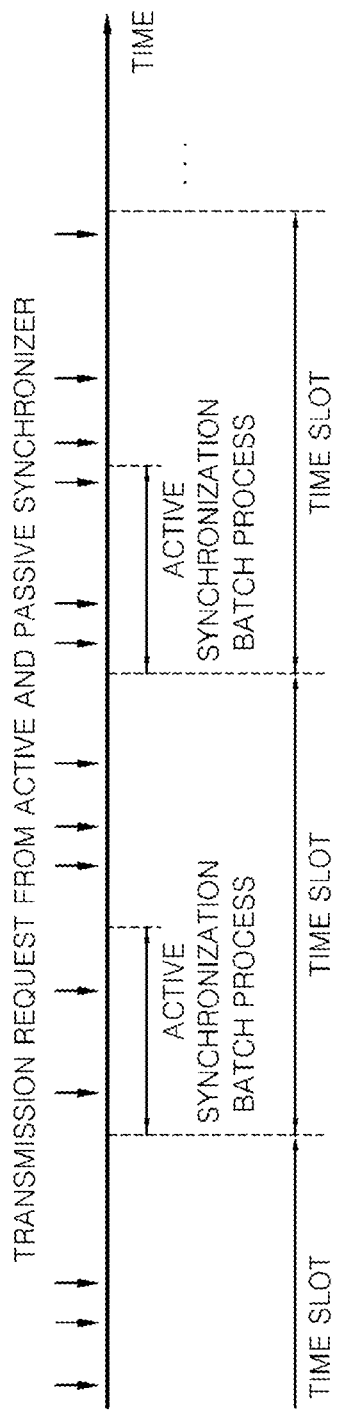
FIG. 4 is a diagram illustrating an exemplary frame transmission process in the active and passive medium access unit included in the data gathering apparatus according to the exemplary embodiment.

FIG. 4 is a diagram illustrating an exemplary frame transmission process in the active and passive medium access unit 250 included in the data gathering apparatus 200 according to the exemplary embodiment.

As illustrated in FIG. 4, the active and passive medium access unit 250 stores the frame to be transmitted in the buffer and then may batch-transmit the frame during an active synchronization batch processing period set in a start point of a next time slot. Such a batch processing method may be applied according to characteristics of an internal system of a site.

In this way, the active and passive medium access unit 250 may implement various frame transmission schedules. This means that the data gathering apparatus 200 may be applied to various environments. This is one of advantages of the active and passive synchronizer 230 and the active and passive medium access unit 250, which are provided in the data gathering apparatus 200.

Hereinafter, operations of the active and passive synchronizer 230 will be described in detail.

The active and passive synchronizer 230 uses a stochastic model for a data update time interval and schedules active synchronization. Before functions of the active and passive synchronizer 230 are described, a concept of an 'expected delay time' will be described as follows.

The expected delay time is a value calculated for each item stored in the cache unit 220, and is an estimated value of an update time interval of a corresponding item when no active synchronization is performed and waiting is performed until next passive synchronization is performed. Here, the term 'update time interval' refers to an interval between time points at which any item is updated by the active or passive synchronization method. The active and passive synchronizer 230 calculates the expected delay time using the following Equation.

$$t_{expected\_delay} = t_{expected\_listen\_period} + t_{last\_listen} - t_{last\_update} \quad \text{[Equation 1]}$$

Here, $t_{expected\_delay}$ represents an expected delay time, $t_{expected\_listen\_period}$ represents an expected passive synchronization cycle, $t_{last\_listen}$ represents a last update time by passive synchronization, and $t_{last\_update}$ represents a last update time.

The expected passive synchronization cycle is a predicted estimator of a cycle by which data is updated by the passive synchronization method using a stochastic model. The last passive synchronization update time is a time at which a value of an item is most recently updated by passive synchronization. The last update time refers to a time at which a value of an item is most recently updated by passive or active synchronization. The active and passive synchronizer 230 receives time measurement data necessary for a process of calculating the expected delay time from the synchronization statistics manager 240.

Meanwhile, the expected passive synchronization cycle is calculated by the following procedures. First, a time interval in which any item is updated by passive synchronization is set to a random variable X and probability distribution of X is assumed as an appropriate model according to characteristics of internal system communication. Normal distribution may be assumed under a general environment having no specific pattern. Next, statistical moment data provided from the synchronization statistics manager 240 is used to set an appropriate estimator in a factor of a cumulative distribution function (CDF) of assumed probability distribution. At this time, a maximum likely-hood estimator (MLE) may be used to set the estimator. Finally, the completed cumulative distribution function is used to calculate a passive synchronization update time interval estimator having sufficient reliability. When the expected passive synchronization cycle is calculated, selection of the probability distribution and reliability of the estimator may be determined experimentally or statistically. For example, in the following Equation, the passive synchronization update time interval is assumed as the normal distribution and the passive synchronization update time interval estimator having reliability of about 95% is calculated.

$$t_{expected\_listen\_period} = \hat{\mu} + 1.64 \cdot \hat{\sigma} \quad \text{[Equation 2]}$$

$$\text{Here, } \hat{\mu} = \frac{1}{k}\sum_{i=1}^{k} x_i, \hat{\sigma}^2 = \frac{1}{k}\sum_{i=1}^{k} (x_i - \bar{x})^2,$$

and $x_1, x_2, \ldots,$ and $x_k$ represent k samples of the update time intervals by passive synchronization.

Functions of the active and passive synchronizer 230 may be described using the concept of this 'expected delay time'. The first embodiment of the active and passive synchronizer 230 includes the following three functions.

Figure 5:
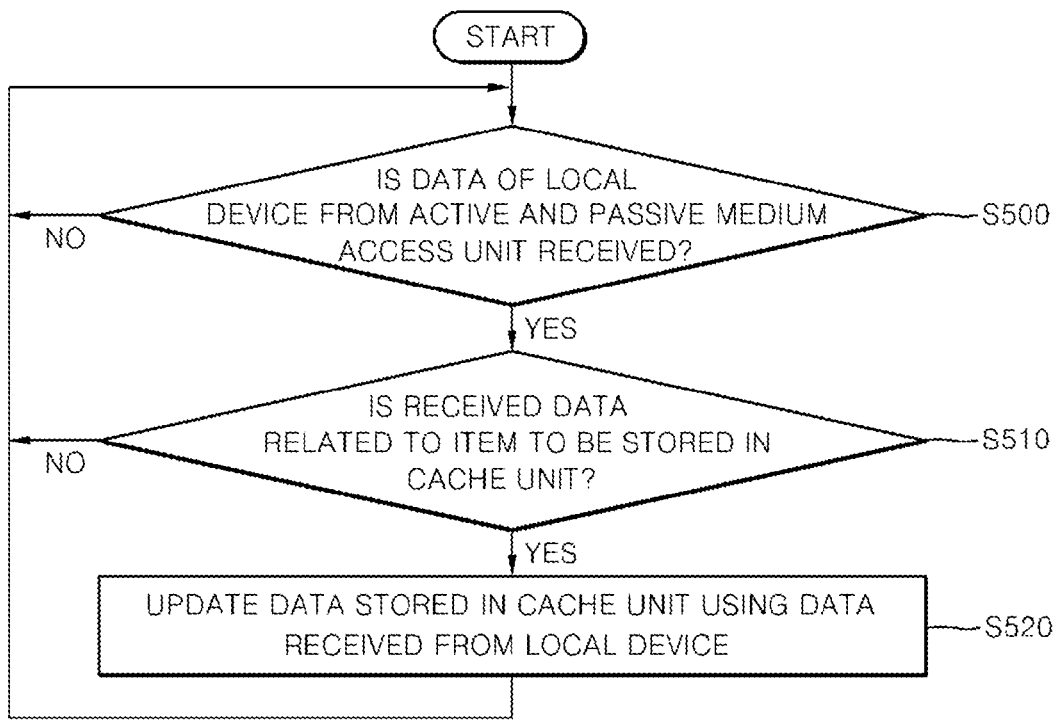
FIG. 5 is a flowchart illustrating a data reception process of an active and passive synchronizer included in the data gathering apparatus according to the exemplary embodiment.

First, the active and passive synchronizer 230 constantly gathers data from the active and passive medium access unit 250. FIG. 5 is a flowchart illustrating a data reception process of the active and passive synchronizer 230. As illustrated in FIG. 5, the active and passive synchronizer 230 receives a frame including data on each of the local devices 110-1 to 110-n from the active and passive medium access unit 250 (S500). Next, when the received frame includes data related to an item to be stored in the cache unit 220 (S510), the active and passive synchronizer 230 updates information on the item stored in the cache unit 220 using the data included in the frame (S520).

Second, the active and passive synchronizer 230 periodically calculates the expected delay time for all items stored in the cache unit 220.

Figure 6:
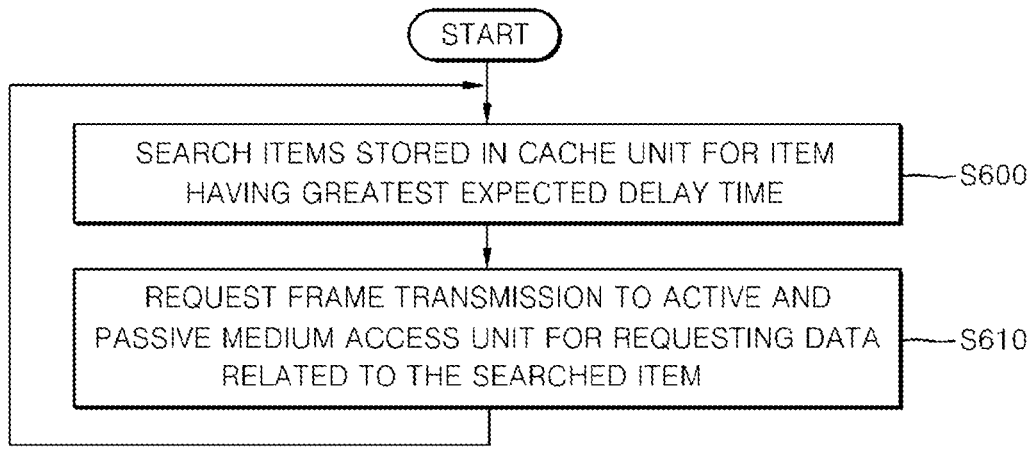
FIG. 6 is a flowchart illustrating an active synchronization performing process of a first embodiment of the active and passive synchronizer included in the data gathering apparatus according to the exemplary embodiment.

Third, the active and passive synchronizer 230 constantly performs active synchronization for all items stored in the cache unit 220. FIG. 6 is a flowchart illustrating an active synchronization performing process according to the first embodiment of the active and passive synchronizer 230. As illustrated in FIG. 6, the active and passive synchronizer 230 searches the cache unit 220 for an item having the greatest expected delay time (S600). Next, the active and passive synchronizer 230 requests transmission of a frame for requesting measurement data or control data related to the searched item from the active and passive medium access unit 250 (S610). This active synchronization performing process may also be considered to be a scheduling task that determines which item of cache items is a next active synchronization target.

The first embodiment of the active and passive synchronizer 230 in this way may be implemented by various methods such as a process, a thread, and an event timer. In view of periodical performing, a cycle for calculating the expected delay time may be determined by various methods according to desired performance, hardware performance of the data gathering apparatus 200, and the like. Also, when the active synchronization is performed, transmission may be delayed by about a single time slot according to implementation of the active and passive medium access unit 250. There are several methods of identifying this state and correcting active synchronization performing scheduling.

In the active synchronization performing process of the active and passive synchronizer 230 has been described with reference to FIG. 6, a process of searching for a cache item having the greatest expected delay time is included. When there are too many cache items depending on environments, this search process may impose a high load on hardware or a memory and decrease real time performance. Therefore, the exemplary embodiment proposes low-cost active and passive synchronization as the second embodiment of the active and passive synchronizer 230.

The low-cost active and passive synchronization uses the concept of 'expected delay time' without change, and additionally uses concepts of an 'active synchronization target', an 'active synchronization execution rate', a 'total active synchronization time' and a 'reference delay time'.

The term 'active synchronization target' is a variable for indicating a cache item to be synchronized next time. The active and passive synchronizer 230 assigns any sequence to items stored in the cache unit 220 and applies an active synchronization scheduling algorithm according to the sequence. In this case, the active synchronization target is a variable for indicating an item to which an algorithm is applied next time in the corresponding sequence.

The term 'active synchronization execution rate' is a value to be measured in a process for performing the active synchronization scheduling algorithm. In a corresponding algorithm, there is a process of determining whether frame transmission for active synchronization is performed on each item. Based on repeated algorithm performing results, the number of times frame transmission is actually performed out of cache items to which the algorithm is applied is statistically measured, and is set as the 'active synchronization execution rate'. The statistical measurement method may use various methods such as an average, a moving average, and a weighted moving average according to how a sample of an event of frame transmission is processed. For example, when all samples are used and an equal weight is assigned, the 'active synchronization execution rate' may be calculated by the following Equation.

$$E_{active} = \frac{N_{req}}{N_{total}} \quad \text{[Equation 3]}$$

Here, $E_{active}$ represents an active synchronization execution rate, $N_{req}$ represents the number of items from which frame transmission is requested, and $N_{total}$ represents the number of items in total to which an algorithm is applied.

The term 'total active synchronization time' is a variable introduced for optimization of the 'reference delay time' to be described, and is a total time taking for active synchronization when an entire active synchronization quota in the time slot is completely used in the second embodiment of the active and passive synchronizer 230. In this case, the 'total active synchronization time' is calculated by the following Equation.

$$T_{active} = \frac{N_{cache\_total} \times E_{active}}{N_{quota}} \times T_{slot} \quad \text{[Equation 4]}$$

Here, $T_{active}$ represents a total active synchronization time, $N_{cache\_total}$ represents the number of cache items in total, $N_{quota}$ represents an active synchronization quota, and $T_{slot}$ represents a size of a time slot.

The term 'reference delay time' is a variable used in the active synchronization scheduling algorithm, and is initially set as any value and is converged to an optimal value as the active and passive synchronizer 230 operates. By the nature of the scheduling algorithm, when the 'reference delay time' increases, the 'total active synchronization time' decreases. When this nature is used, a value of the 'reference delay time' can be gradually changed to become closer to the 'total active synchronization time' and finally, the 'total active synchronization time' and 'reference delay time' may have almost the same value. For example, a method of periodically changing the 'reference delay time' may be implemented using the following Equation.

$$T_{threshold} \leftarrow \frac{T_{active} + T_{threshold}}{2} \quad \text{[Equation 5]}$$

Here, $T_{threshold}$ represents a reference delay time.

According to the low-cost active and passive synchronization operations to be described, the 'total active synchronization time' reflects a result to which an existing set 'reference delay time' is applied. Therefore, it is understood that the second embodiment of the active and passive synchronizer 230 uses a result feedback principle of a variable of the 'reference delay time'.

In this case, initial values of the 'active synchronization target' and 'reference delay time' may be determined by various methods. The 'active synchronization execution rate' may be determined by various statistical methods such as an average, a moving average, and a weighted moving average according to how a sample of an event of frame transmission is processed. In addition, there are several expressions for changing the 'reference delay time' such that values of the 'total active synchronization time' and the 'reference delay time' become the same in addition to Equation 5.

When the aforementioned concepts of the 'expected delay time', the 'active synchronization target', the 'active synchronization execution rate', the 'total active synchronization time', and the 'reference delay time' are used, it is possible to describe the low-cost active and passive synchronization of the active and passive synchronizer 230. The active and passive synchronizer 230 performs the low-cost active and passive synchronization through the following five operations.

First, the active and passive synchronizer 230 constantly receives a frame received in the active and passive medium access unit 250, and updates information on the item using data included in the frame when the received frame includes data related to an item stored in the cache unit 220. Second, the active and passive synchronizer 230 periodically calculates the expected delay time for all cache items. These operations are the same as in the first embodiment of the active and passive synchronizer 230. Third, the active and passive synchronizer 230 calculates the "active synchronization execution rate" periodically or constantly. Fourth, the active and passive synchronizer 230 periodically calculates the 'total active synchronization time' and changes the 'reference delay time' such that the 'total active synchronization time' and 'reference delay time' become closer. Fifth, finally, the active and passive synchronizer 230 constantly schedules and executes active synchronization for all cache items (schedule and execute).

Figure 7:
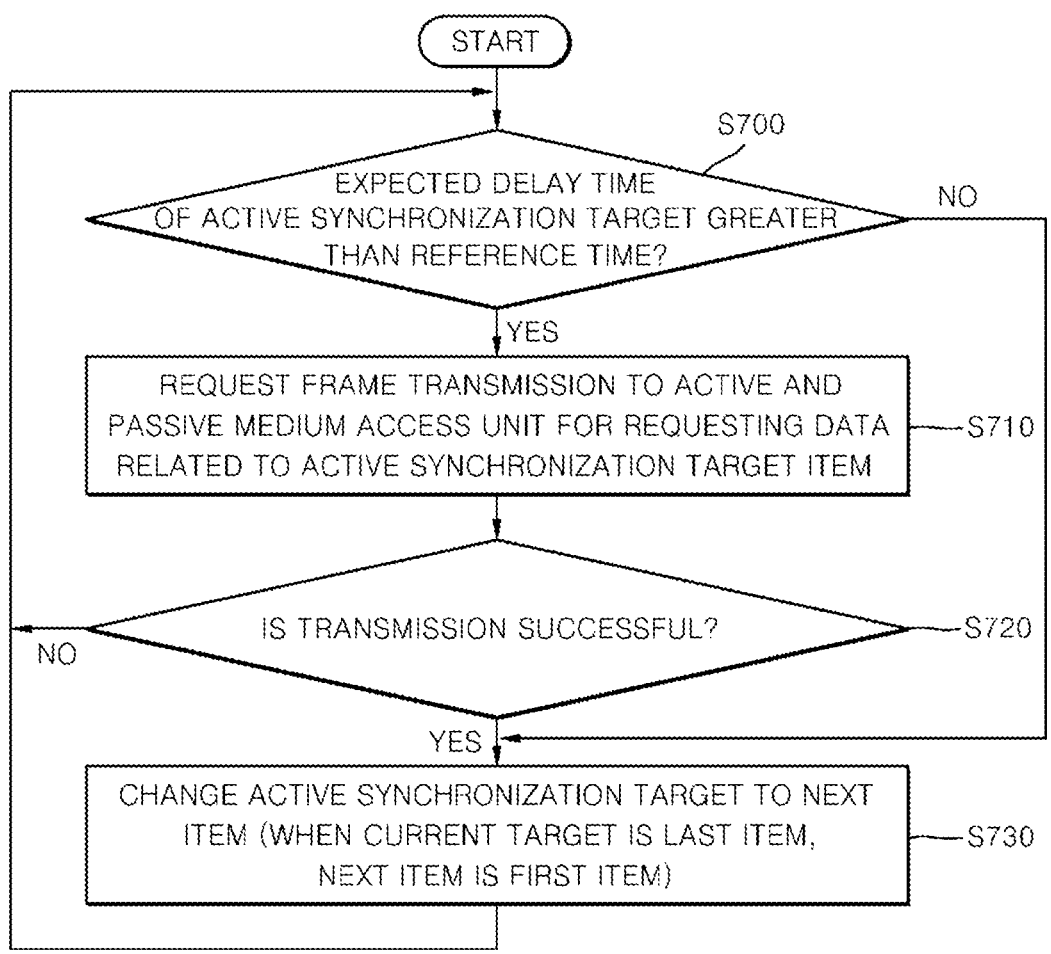
FIG. 7 is a flowchart illustrating an active synchronization scheduling and executing process that is a fifth operation of low-cost active synchronization operations of the active and passive synchronizer included in the data gathering apparatus according to the exemplary embodiment.

FIG. 7 is a flowchart illustrating an active synchronization scheduling and executing process that is a fifth operation of the low-cost active synchronization operations of the active and passive synchronizer 230.

First, the active and passive synchronizer 230 determines whether an 'expected delay time' of an item that is a current 'active synchronization target' is greater than a reference delay time (S700). When the expected delay time is greater than the reference delay time, the active and passive synchronizer 230 requests transmission of a frame for requesting measurement data or control data related to an item of the 'active synchronization target' from the active and passive medium access unit 250 (S710). Next, when frame transmission of the active and passive synchronizer 230 is successful (S720), the 'active synchronization target' is changed to a next cache item (S730). On the other hand, when the expected delay time is less than the reference delay time, the active and passive synchronizer 230 performs the operation of S730.

The second embodiment of the active and passive synchronizer 230 including the above five functions may be implemented by various methods such as a process, a thread, and an event timer. In view of periodical performing, a cycle for calculating the expected delay time may be determined by various methods according to desired performance, hardware performance of the data gatherer, and the like, like in the first embodiment. In addition, when the active synchronization scheduling is performed, transmission may be delayed by about a single time slot according to implementation of the active and passive medium access unit 250. There are several methods for identifying this state and correcting the scheduling process.

Figure 8:
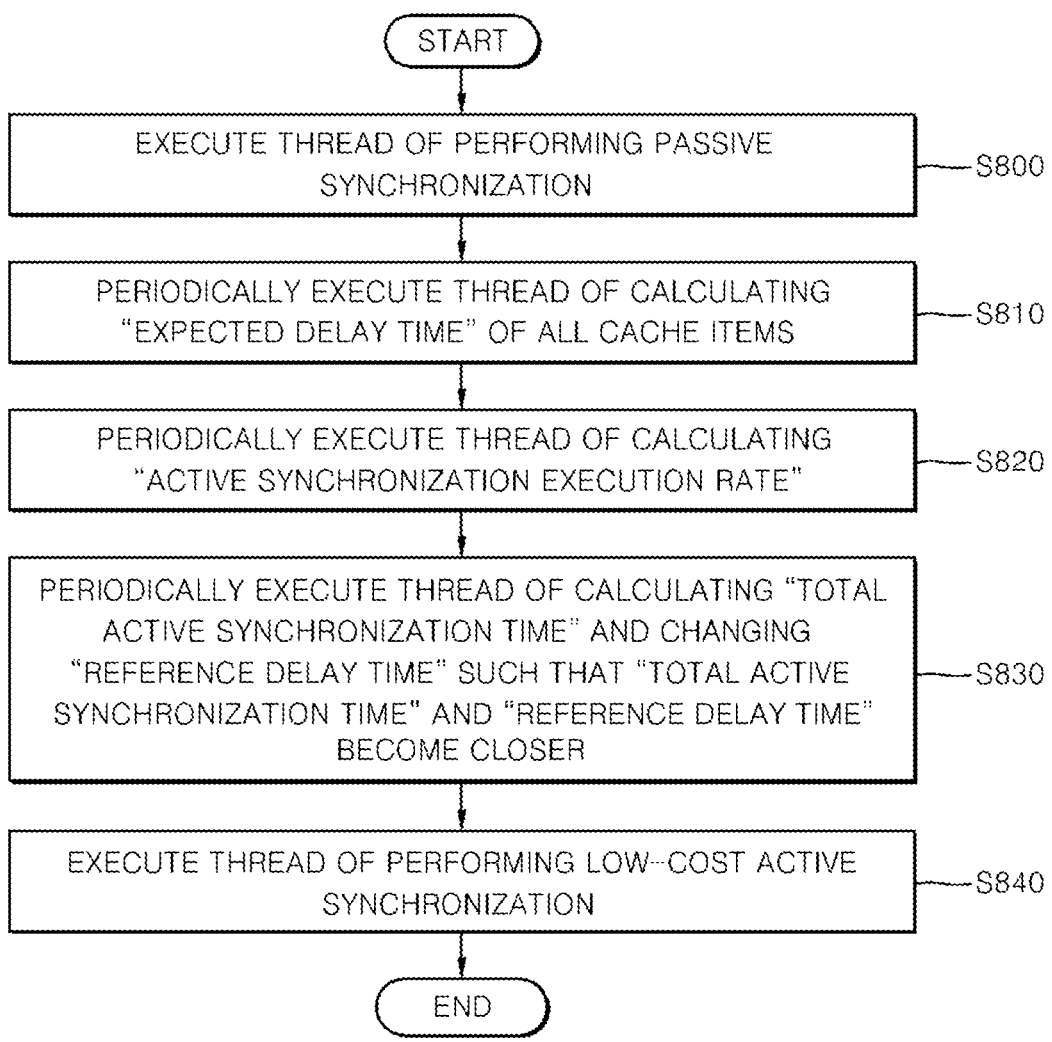
FIG. 8 is a flowchart illustrating an embodiment in which a second embodiment of the active and passive synchronizer according to the exemplary embodiment is implemented by a method using a thread.

FIG. 8 is a flowchart illustrating an embodiment in which the second embodiment of the active and passive synchronizer 230 according to the exemplary embodiment is implemented by a method using a thread.

As illustrated in FIG. 8, the active and passive synchronizer 230 executes a thread of performing the passive synchronization described with reference to FIG. 5 (S800). Next, the active and passive synchronizer 230 periodically executes a thread of calculating the 'expected delay time' of all cache items (S810). Next, the active and passive synchronizer 230 periodically executes a thread of calculating the 'active synchronization execution rate' (S820). Next, the active and passive synchronizer 230 periodically executes a thread of calculating the 'total active synchronization time' and changing the 'reference delay time' such that the 'total active synchronization time' and the 'reference delay time' become closer (S830). Next, the active and passive synchronizer 230 executes a thread of performing the low-cost active synchronization scheduling and executing described with reference to FIG. 7 (S840).

Figure 9:
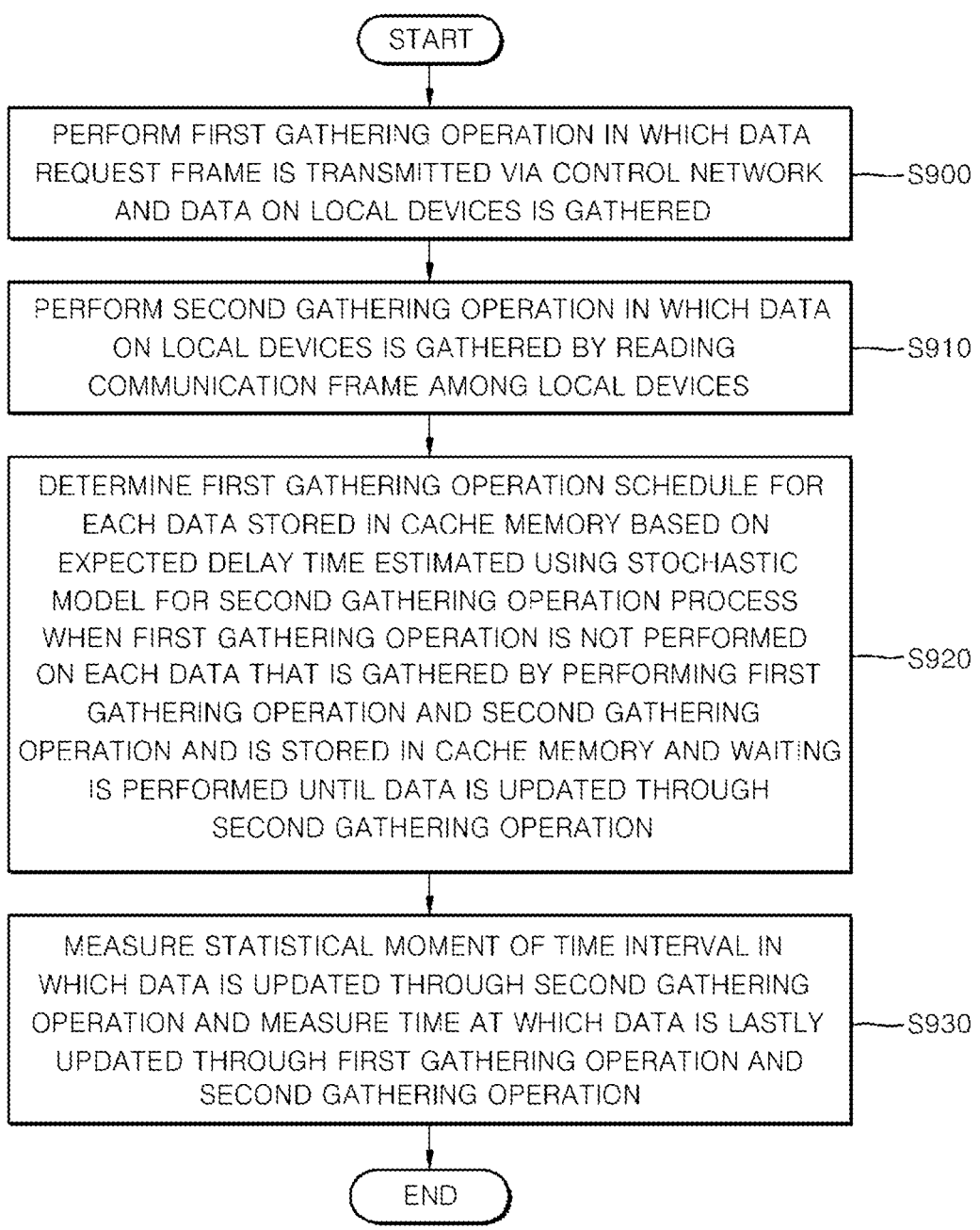
FIG. 9 is a flowchart illustrating a process of performing a data gathering method according to the exemplary embodiment.

FIG. 9 is a flowchart illustrating a process of performing a data gathering method according to the exemplary embodiment.

As illustrated in FIG. 9, the active and passive synchronizer 230 performs a first gathering operation (active synchronization) in which a data request frame is transmitted via the control network and data on the local devices 110-1 to 110-n is gathered (S900). In this case, when the number of frames transmitted is within the active synchronization quota that is the maximum number of times frame transmission can be performed for the second gathering operation in a time slot of a time point at which frame transmission for data gathering is requested, the active and passive synchronizer 230 performs frame transmission for data gathering. Also, the active and passive synchronizer 230 performs a second gathering operation (passive synchronization) in which data on the local devices 110-1 to 110-n is gathered by reading a communication frame among the local devices 110-1 to 110-n (S910).

Next, when the first gathering operation is not performed on each data that is gathered by performing the first gathering operation and the second gathering operation and is stored in a cache memory and waiting is performed until the data is updated through the second gathering operation, the active and passive synchronizer 230 determines a first gathering operation schedule for each data stored in the cache memory based on the expected delay time estimated using a stochastic model for the second gathering operation process (S920). In this case, the active and passive synchronizer 230 calculates the expected delay time such that the expected passive synchronization cycle that is a predicted estimator of a cycle by which data is updated through the second gathering operation using a stochastic model and a last passive synchronization update time that is a time at which data is most recently updated through the second gathering operation are added, and then a last update time that is a time at which data is most recently updated through the first gathering operation or the second gathering operation is subtracted.

Next, the synchronization statistics manager 240 measures a statistical moment of a time interval in which data is updated through the second gathering operation and measures a time at which data is lastly updated through the first gathering operation and the second gathering operation (S930).

In the above description, the operating sequence of the method described with reference to the accompanying drawings is not limited to the sequence illustrated in the drawings. For example, in FIG. 9, the second gathering operation may be performed before the first gathering operation or performed together with the first gathering operation. Also, in FIG. 9, statistical moment measurement and update time measurement may also be performed before the first gathering operation schedule is determined.

The inventive concept may be implemented as a computer readable code in a computer readable recording medium. The computer readable recording medium includes any type of recording devices in which data that can be read by a computer system is stored. Examples of the computer readable recording medium include a ROM, a RAM, a CD-ROM, a magnetic tape, a floppy disk, and an optical data storage device, and also include implementation in the form of a carrier wave (for example, transmission via the Internet). In addition, the computer readable recording medium may be distributed to a computer system connected via a network and a code that can be read by a computer is stored and executed in a distributed manner.

In a data gathering apparatus and a method thereof according to the exemplary embodiments, it is possible to increase data gathering performance from the control network with low hardware specifications by efficiently synchronizing data in other devices and its own buffer. In addition, it is possible to provide a small delay time for an external system without increasing a load on an internal system and reduce a building cost in various systems requiring data gathering from the control network.

While exemplary embodiments have been illustrated and described above, the inventive concept is not limited to the aforementioned specific exemplary embodiments. Those skilled in the art may variously modify the exemplary embodiments without departing from the gist of the inventive concept claimed by the appended claims and the modifications are within the scope of the claims.

What is claimed is:

1. A data gathering apparatus, comprising:
    a cache unit configured to store data, gathered from local devices connected via a control network, and constituting cached data items;
    an active and passive synchronizer, comprising at least one hardware processor, configured:
    to perform a first gathering operation in which:
        a data request frame is transmitted via the control network, and data on the local devices is gathered and stored as cached data items;
    to perform a second gathering operation in which data on the local devices is gathered and stored as cached data items by reading a communication frame communicated over the control network; and
    to determine a first gathering operation schedule for each of the cached data items based on an expected delay time, estimated using a stochastic model for the second gathering operation process, in case that waiting is performed until the each of the cached data items is updated through the second gathering operation without performing the first gathering operation; and
    an active and passive medium access unit having a receiver and a transmitter, configured to deliver data obtained from a frame received via the control network to the active and passive synchronizer and to transmit a frame for gathering data on the local devices of the control network in response to a request of the active and passive synchronizer.

2. The apparatus according to claim 1, further comprising a synchronization statistics manager configured to measure a statistical moment of a time interval in which data is updated through the second gathering operation and measure a time at which data is most recently updated through the first gathering operation and the second gathering operation.

3. The apparatus according to claim 1, further comprising a service interface unit configured to:
    when a request message, including a data identifier list, is received from an external system connected via a communication network, read data corresponding to the data identifiers from the cache unit,
    put the data in a response message, and
    transmit the message to the external system in response to the request message received from the external system.

4. The apparatus according to claim 1, wherein the active and passive medium access unit performs frame transmission for gathering data requested from the active and passive synchronizer when the number of frames transmitted in a time slot of a time point at which a frame transmission request for data gathering is received from the active and passive synchronizer is within an active synchronization quota that is the maximum number of times frame transmission can be performed for the first gathering operation by the active and passive medium access unit.

5. The apparatus according to claim 4, wherein the active and passive medium access unit is further configured to respond to a request, from the active and passive synchronizer to transmit a data request frame, for gathering data from the local devices, by:
    storing the frame in its own buffer, and then
    batch-transmitting the stored frame at a start point of a time slot subsequent to a time slot of a time at which the data request frame is received.

6. The apparatus according to claim 1, wherein the active and passive synchronizer calculates the expected delay time by:
    adding together:
        an expected passive synchronization cycle, and
        a last passive synchronization update time; and then
    subtracting a last update time;
    wherein:
        the expected passive synchronization cycle is a predicted estimator of a cycle by which data is updated through the second gathering operation using a stochastic model,
        the last passive synchronization update time is a time at which data is most recently updated through the second gathering operation, and
        the last update time is a time at which data is most recently updated through at least one of the first gathering operation and the second gathering operation.

7. The apparatus according to claim 6, wherein the active and passive synchronizer is further configured to:
    set a probability distribution of a time interval, in which data stored in the cache unit is updated through the second gathering operation, based on a communication characteristic of an internal system of the control network,
    receive statistical moment data provided from the synchronization statistics manager, and
    calculate the expected passive synchronization cycle after an estimator of a factor of a cumulative distribution function of the set probability distribution is set using the received statistical moment data.

8. The apparatus according to claim 1, wherein the active and passive synchronizer is further configured to:
    search the cache unit for data having the greatest expected delay time,
    receive data related to the searched data from the active and passive medium access unit, and
    update data stored in the cache unit.

9. The apparatus according to claim 1, wherein, the active and passive synchronizer is further configured to:
    receive data, from the active and passive medium access unit, related to active synchronization target data, when an expected delay time of active synchronization target data is greater than a preset reference delay time, and
    update data stored in the cache unit.

10. The apparatus according to claim 9, wherein the active and passive synchronizer is further configured to change the reference delay time according to the following Equation:

$$T_{threshold} \leftarrow \frac{T_{active} + T_{threshold}}{2}$$

where:

$T_{threshold}$ represents a reference delay time, $T_{active}$ represents a total active synchronization time defined as $$T_{active} = \frac{N_{cache\_total} \times E_{active}}{N_{quota}} \times T_{slot},$$

$N_{cache\_total}$ represents the number of pieces of data in total stored in the cache unit, $E_{active}$ represents an active synchronization execution rate defined as $$E_{active} = \frac{N_{req}}{N_{total}},$$

$N_{req}$ represents the number of pieces of data from which frame transmission is requested, $N_{total}$ represents the number of pieces of data in total to which an algorithm is applied, $N_{quota}$ represents an active synchronization quota that is the maximum number of times frame transmission can be performed for the active synchronization by the active and passive medium access unit, and $T_{slot}$ represents a size of a time slot.

11. A data gathering method that is performed in a data gathering apparatus for gathering data from local devices connected via a control network, the method comprising:
(a) performing a first gathering operation comprising:
transmitting a data request frame, from a transmitter, via the control network,
gathering first data about the local devices, and
storing data items, corresponding to the first gathered data, in a cache memory;
(b) performing a second gathering operation comprising:
gathering second data about the local devices by reading a communication frame communicated among the local devices, and
storing data items, corresponding to the second gathered data, in the cache memory; and
(c) determining a first gathering operation schedule for each of the cached data items, based on an expected delay time, estimated using a stochastic model for the second gathering operation process, in case that waiting is performed until the each of the cached data items is updated through the second gathering operation without performing the first gathering operation.

12. The method according to claim 11, further comprising (d) measuring a statistical moment of a time interval in which data is updated through the second gathering operation and measuring a time at which data is most recently updated through the first gathering operation and the second gathering operation.

13. The method according to claim 11, wherein:
in the operation of (a), frame transmission for the data gathering is performed when the number of frames transmitted, in a time slot of a point in time at which frame transmission for the data gathering is requested, is within an active synchronization quota, and the active synchronization quota is the maximum number of times frame transmission can be performed for the second gathering operation.

14. The method according to claim 11, wherein operation (c) further comprises calculating the expected delay time by:

adding together:
an expected passive synchronization cycle, and
a last passive synchronization update time; and then
subtracting a last update time;
wherein:
the expected passive synchronization cycle is a predicted estimator of a cycle by which data is updated through the second gathering operation using a stochastic model,
the last passive synchronization time is a time at which data is most recently updated through the second gathering operation, and
the last update time is a time at which data is most recently updated through at least one of the first gathering operation and the second gathering operation.

15. The method according to claim 14, wherein operation (c) includes:
(c1) setting a probability distribution of a time interval in which data stored in the cache memory is updated through the second gathering operation based on a communication characteristic of an internal system of the control network; and
(c2) calculating the expected passive synchronization cycle after an estimator of a factor of a cumulative distribution function of the set probability distribution is set using statistical moment data calculated based on a time interval in which data is updated through the second gathering operation.

16. The method according to claim 11, wherein, operation (c) includes:
(c3) searching the cache memory for data having the greatest expected delay time; and
(c4) gathering, from a local device, data related to the searched data, and updating the data stored in the cache memory.

17. The method according to claim 11, wherein, in operation (c), when an expected delay time of active synchronization target data is greater than a preset reference delay time:
data is gathered from a local device related to the active synchronization target data and
the data stored in the cache memory is updated.

18. The method according to claim 17, wherein, in operation (c), the reference delay time is changed according to the following Equation:

$$T_{threshold} \leftarrow \frac{T_{active} + T_{threshold}}{2}$$

where:
$T_{threshold}$ represents a reference delay time,
$T_{active}$ represents a total active synchronization time defined as $$T_{active} = \frac{N_{cache\_total} \times E_{active}}{N_{quota}} \times T_{slot},$$

$N_{cache\_total}$ represents the number of pieces of data in total stored in the cache unit,
$E_{active}$ represents an active synchronization execution rate defined as $$E_{active} = \frac{N_{req}}{N_{total}},$$

$N_{req}$ represents the number of pieces of data from which frame transmission is requested, $N_{total}$ represents the number of pieces of data in total to which an algorithm is applied, $N_{quota}$ represents an active synchronization quota that is the maximum number of times frame transmission can be performed for the active synchronization by the active and passive medium access unit, and $T_{slot}$ represents a size of a time slot.

19. A non-transitory computer readable recording medium storing a program configured to enable a computer, during execution, to perform operations comprising:

(a) performing a first gathering operation comprising:
transmitting a data request frame, from a transmitter, via the control network,
gathering first data about the local devices, and
storing data items, corresponding to the first gathered data, in a cache memory;

(b) performing a second gathering operation comprising:
gathering second data about the local devices by reading a communication frame communicated among the local devices, and
storing data items, corresponding to the second gathered data, in the cache memory; and (c) determining a first gathering operation schedule for each of the cached data items, based on an expected delay time, estimated using a stochastic model for the second gathering operation process, wherein:
the expected delay time includes a time when the first gathering operation is not performed on each of the cached data items, and
waiting is performed until the each of the cached data items is updated through the second gathering operation.

* * * * *